May 26, 1936.  J. N. GOOD  2,042,094
WARNING DEVICE FOR BRAKES
Filed Jan. 3, 1935
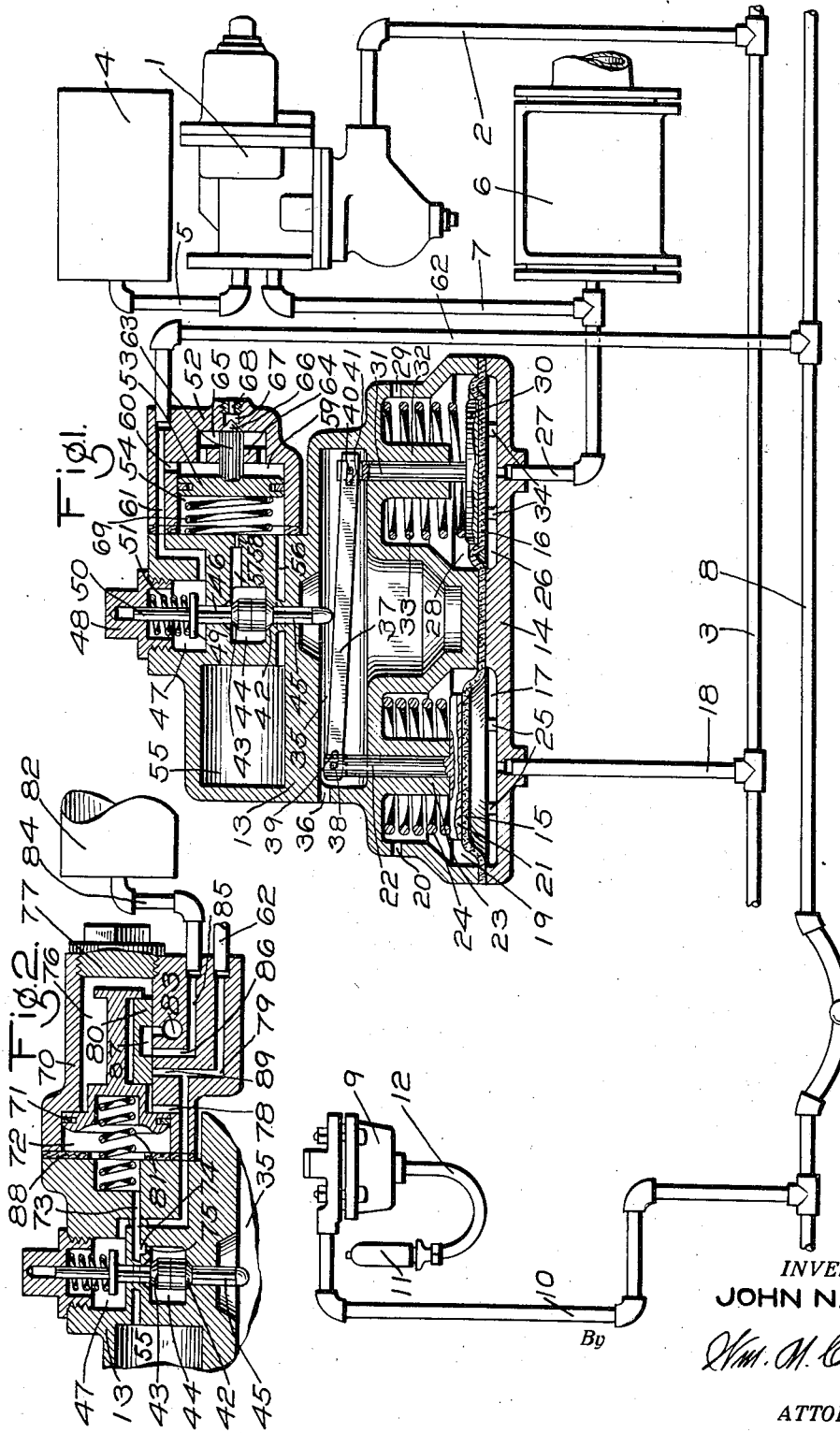
INVENTOR.
JOHN N. GOOD
By *Wm. M. Cady*
ATTORNEY.

Patented May 26, 1936

2,042,094

UNITED STATES PATENT OFFICE 2,042,094

WARNING DEVICE FOR BRAKES

John N. Good, Wilmerding, Pa., assignor to The Westinghouse Air Brake Company, Wilmerding, Pa., a corporation of Pennsylvania Application January 3, 1935, Serial No. 215

17 Claims. (Cl. 303—86)

This invention relates to fluid pressure brakes and more particularly to the type adapted to be controlled in accordance with variations in pressure in the brake pipe.

In controlling the brakes on a train equipped with fluid pressure brake apparatus, there is a possibility that the brakes on one or more of the cars in a train will fail to release when the brake pipe pressure is increased to effect the release of the brakes. Such undesired operation may, for instance, occur at or near the rear end of the train in case a triple valve device is in such worn condition that upon an increase in brake pipe pressure the auxiliary reservoir pressure will increase, due to leakage from the brake pipe past the triple valve piston at such a rate as to prevent obtaining a sufficient differential on the triple valve piston to move the parts of the triple valve device to the release position. With the triple valve device thus remaining in application or application lap position, the fluid pressure is held in the brake cylinder and acts to cause flat wheels, undue wear of the brake shoes and wheels, interference with the free movement of the train, and other undesired effects.

The principal object of the invention is to provide means which will automatically operate to signal the engineman of the train in case the brakes on a car of the train for any reason remain applied when the brake pipe pressure is increased to effect the release of the brakes.

The above object is attained by providing on each car of the train a valve device controlled by brake pipe pressure and brake cylinder pressure, and which is adapted to operate, in case the brakes on the car fail to release when intended, to effect a reduction in pressure in the usual train signal pipe and thereby effect operation of the engineer's signal device on the locomotive to warn the engineer that the brakes on a car in a train have failed to release, so that he may take the proper steps to obtain the release of said brakes.

In the accompanying drawing, Fig. 1 is a diagrammatic view, partly in section, of a fluid pressure brake equipment for a car, and a portion of an air signal system for a train, and showing the invention associated therewith; and Fig. 2 is a sectional view of a portion of the signal pipe venting device shown in Fig. 1, but embodying a modified form of the invention.

As shown in the drawing, the fluid pressure brake equipment comprises a triple valve device 1 connected through a branch pipe 2 to a brake pipe 3, an auxiliary reservoir 4 connected to said triple valve device through a pipe 5, and a brake cylinder 6 connected to said triple valve device through a brake cylinder pipe 7. The triple valve device may be of any conventional type adapted to operate upon a reduction of pressure in the brake pipe 3 to supply fluid from the auxiliary reservoir 4 to the brake cylinder 6 to effect an application of the brakes, and upon an increase of pressure in the brake pipe, to close communication between said auxiliary reservoir and said brake cylinder, to supply fluid under pressure from the brake pipe to the auxiliary reservoir and to connect the brake cylinder to atmosphere for releasing the brakes in the usual well known manner.

The signal system shown in the drawing is of the usual type comprising a signal pipe 8 adapted to extend through the train, a signal valve device 9 adapted to be carried on the locomotive and connected to said signal pipe through a branch pipe 10, and an engineer's signal whistle 11 connected to said signal valve device through a pipe 12, the signal valve device 9 being adapted to respond to reductions in pressure in the signal pipe 8 for supplying fluid under pressure to the signal whistle 11 for effecting operation thereof in the usual well known manner.

According to the invention, a venting device is provided which comprises a casing 13, a cover 14 secured to said casing, and two flexible diaphragms 15 and 16 clamped between said casing and cover. The diaphragm 15 forms at one side a pressure chamber 17 which is connected to the brake pipe through a branch pipe 18, and at the opposite side a chamber 19 which is open to atmosphere through a passage 20. A follower 21, disposed in the chamber 19, engages the diaphragm, and said follower has a stem 22 which is adapted to slide in a suitable bore in a sleeve portion 23 of the casing, the end of said sleeve portion acting as a stop for limiting movement of the follower inwardly. A spring 24 of predetermined value is disposed in the chamber 19 and bears against the follower and against the inner wall of said chamber for urging the diaphragm 15 against spaced stops 25.

The diaphragm 16 forms at one side a pressure chamber 26 which is connected to the brake cylinder pipe through a pipe 27, and at the opposite side a chamber 28 which is open to atmosphere through a passage 29. A follower 30, disposed in the chamber 28, engages the diaphragm, said follower having a stem 31 similar to stem 22, adapted to slide in a suitable bore, arranged substantially parallel to that in which the stem 22 operates, in a sleeve portion 32, the end of which acts as a stop for limiting inward movement of said follower. A suitable spring 33 is disposed in the chamber 28 and urges the diaphragm 16 against spaced stops 34.

The stems 22 and 31 both extend into a chamber 35 which is vented to atmosphere through a passage 36. A movable rod-like yoke 37 is disposed in the chamber 35, and has one end pivotally connected to the stem 22 by means of a pin 38 carried by the stem and passing through a slot 39 in said yoke, and has the opposite end pivotally connected to the stem 31 by means of a pin 40 carried by the stem and passing through a slot 41 in the yoke, said slots being provided for ensuring against binding of the stems in operation. The yoke is adapted to control the operation of a pair of oppositely seating, axially arranged valves 42 and 43, disposed in a chamber 44, having fluted stems 45 and 46, which slidably extend through suitable bores in the casing into chamber 35 and a chamber 47, respectively, the stem 45 being disposed in operating alignment with the yoke. The outer end of chamber 47 is closed by a cap nut 48 and said chamber contains a plunger 49 carried by a stem 50 which is mounted to slide in a suitable bore in the cap nut, and a spring 51 is provided between the plunger and the cap nut for pressing the plunger into engagement with the stem 50, thereby urging the valve 43 from its seat and the valve 42 to its seat, as shown in the drawing.

A venting portion 52 is secured to the casing 13 and contains a piston 53, having at one side a chamber 54 which is connected to a volume chamber 55 through a passage 56 and to the valve chamber 44 through a passage 57 having a restricted portion 58, and having at the opposite side a chamber 59 which is connected through a passage 60 to a passage 61, communicating with the chamber 47 and also communicating through a branch pipe 62, with the signal pipe.

The piston 53 is provided with a stem 63 which projects through a suitable bore in an apertured partition wall 64 separating chamber 59 from a chamber 65, and a vent valve 66 is provided on the end of said stem which is adapted to control communication from chamber 65 to an atmospheric exhaust passage 67 through a restricted passage in a choke plug 68. A spring 69 is contained in the chamber 54 and acts on the piston to urge the vent valve 66 to its seat.

In operation, when the train signal system is charged with fluid under pressure in the usual manner, fluid supplied to the signal pipe 8 flows through the branch pipe 62 and passage 61 into the chamber 47, and through passage 60 into the chambers 59 and 65, thereby charging chambers 47, 59 and 65. Fluid supplied from chamber 47 flows from said chamber past the valve stem 46 into the chamber 44, and thence through passage 57 and restricted portion 58 into the chamber 54, and through passage 56 into the volume chamber 55, thereby charging chambers 44, 54 and 55.

When the brake pipe 3 is charged in the usual manner with fluid under pressure, the triple valve device 1 is operated to supply fluid under pressure to the auxiliary reservoir 4 and to vent the brake cylinder 6 in the usual well known manner; and since the diaphragm chamber 26 of the venting valve device is connected to the brake cylinder, said chamber is also normally at atmospheric pressure. Fluid from the brake pipe is supplied through the pipe 18 to the chamber 17, and acts on the diaphragm 15, overcomes the pressure of the spring 24 and forces the diaphragm 15, follower 21 and stem 22 inwardly. This movement of the stem tilts the yoke 37 about the fulcrum pin 40 which at this time remains in a fixed position due to the chamber 26 being vented with the brake cylinder through the triple valve device 1. It will be noted that in the movement of the yoke just described, the portion of said yoke in operating alignment with the valve stem 45 does not move sufficiently to unseat the valve 42.

When the brake pipe pressure is reduced to effect an application of the brakes, the triple valve operates in the usual manner to close communication from the brake cylinder to the atmosphere and to supply fluid from the auxiliary reservoir to the brake cylinder. When the brake pipe pressure is reduced and the brake cylinder pressure is increased in the manner just described, the reduction in brake pipe pressure in chamber 17 of the venting valve device permits the spring 24 to move the diaphragm 15, follower 21 and stem 22 downwardly, while brake cylinder pressure supplied to chamber 26 acts to deflect the diaphragm 16 and thereby move the follower 30 and stem 31 upwardly. The springs 24 and 33 are so proportioned that for any degree of reduction in brake pipe pressure and consequent tilting movement of the left hand end of the yoke, the corresponding increase in brake cylinder pressure provides a substantially compensating movement of the right hand end of the yoke, so that the portion of the yoke in alignment with the valve stem 45 remains in a substantially fixed position with respect to the end of said valve stem.

In order to effect a release of the brakes, fluid under pressure is supplied to the brake pipe in the usual manner, and if the triple valve operates as intended, the consequent increase in brake pipe pressure acts to operate said triple valve to supply fluid to the auxiliary reservoir and to vent the fluid under pressure from the brake cylinder. The consequent reduction in brake cylinder pressure in the chamber 26 then permits the spring 33 to move the diaphragm 16, follower 30 and stem 31 downwardly, while brake pipe pressure increasing in chamber 17 acts to force the diaphragm 15, follower 21 and stem 22 upwardly, so that the yoke 37 is again tilted without being brought into operative engagement with the valve stem 45.

If when the brake pipe pressure is increased, a triple valve device fails to operate to release fluid under pressure from the brake cylinder in the manner above described, then the right hand end of the yoke is maintained in its upper position, and since the left hand end of the yoke is lifted by the increase of brake pipe pressure, the center of the yoke is raised and acts to unseat the valve 42 and to seat the valve 43.

When the valve 42 is unseated, the pressure of fluid in the chamber 54 and connected volume chamber 55 is gradually reduced by flow through passage 56, restricted portion 58, passage 57, chamber 44, past stem 45, and through chamber 35 to the atmosphere. When the pressure on the left hand side of the piston 53 is thus reduced to a sufficient degree, the fluid pressure on the opposite side overcomes the pressure of spring 69 and moves said piston towards the left hand. This movement of the piston acts to unseat the vent valve 66, which permits fluid to flow from the signal pipe to the atmosphere through chambers 59 and 65 and the restricted passage in choke 68, and thereby to effect a reduction in signal pipe pressure. The reduction in signal pipe pressure thus effected is transmitted through the signal pipe and acts to effect the operation of the signal valve 9 on the locomotive to supply fluid under pressure to the whistle 11 for effecting the operation thereof in the usual well known manner.

When the vent valve 66 is unseated, the pressure of fluid in chambers 59 and 65 is adapted to be reduced by flow past said vent valve at a more rapid rate than the opposing pressure in chamber 54 reduces due to the flow of fluid through the restricted portion 58, and when the pressure in chamber 59 is thus reduced sufficiently, the pressure of fluid in chamber 54 plus that of spring 69 acts to move the piston toward the right hand and thereby to seat the vent valve so as to prevent further flow of fluid from the signal pipe. After the vent valve is thus seated, the pressure in chamber 59 builds up by flow from the signal pipe, and when built up to a degree sufficient to overcome the reducing pressure in chamber 54, again moves piston 53 towards the left hand. This movement of the piston acts to unseat the vent valve to effect another reduction in pressure in the signal pipe for effecting transmission of the warning to the engineer as above described.

In the manner just described, the venting valve device operates to effect a series of successive reductions in signal pipe pressure, causing repeated signals to be made, due to the alternate unseating and seating of the vent valve 66.

After the engineer is warned, as hereinbefore described, that the brakes on a car in the train have failed to release, said brakes may be released by manual operation of the usual auxiliary reservoir release valve device (not shown) on the car to vent fluid under pressure from the auxiliary reservoir and thereby to cause the triple valve device to move to the release position to vent fluid under pressure from the brake cylinder. The consequent reduction in pressure in the chamber 26 permits the spring 33 to move the diaphragm 16 downwardly, and thereby to pull the right hand end of the yoke downwardly and away from the stem 45. With the pressure of the yoke thus removed from the valve stem 45, the spring 51 acts to seat valve 42 and to unseat valve 43, and signal pipe pressure is restored in chambers 44, 54 and 55. When the pressures on opposite sides of the piston 53 are equalized, said piston is then operated by spring 69 to hold the vent valve 66 seated as shown in the drawing.

According to the form of the invention shown in Fig. 2 a venting valve device is provided similar in construction to that shown in Fig. 1, except that instead of the venting portion 52, a slide valve portion 70 is secured to the casing 13. The slide valve portion 70 contains a piston 71 having on one side a piston chamber 72 connected through a passage 73 to the volume chamber 55, and through a passage 74 having a restricted portion 75 to the chamber 44, and having on the opposite side a valve chamber 76 which is closed by a cap nut 77 and which is connected through a port 78 and a passage 79 to the branch pipe 62 leading to the signal pipe. A slide valve 80 is disposed in the chamber 76 and is adapted to be operated by the piston 71, which is normally held in the position shown in the drawing by a spring 81 contained in chamber 72. A limiting reservoir 82 is provided and normally is connected to an exhaust port 83 through a pipe 84, a passage 85, a port 86, and a cavity 87 in the slide valve.

The operation of the valves 42 and 43 in the construction shown in Fig. 2 is substantially the same as that of said valves in the construction shown in Fig. 1. If fluid under pressure is not released from the brake cylinder when brake pipe pressure is increased to effect the release of the brakes, in the manner hereinbefore described, the unseating of valve 42 by operation of the yoke upon charging of the brake pipe vents fluid under pressure from the piston chamber 72 and connected volume chamber 55 to the atmosphere by way of passages 73, 74 and 75, chamber 44, past stem 45 and through chamber 35. When fluid under pressure is thus vented from piston chamber 72, signal pipe pressure in valve chamber 76 moves the piston 71 and slide valve 80 towards the left hand until said piston seals against a gasket 88. In this position of the slide valve, the cavity 87 establishes communication between passage 86 and a passage 89 connected to passage 79, so that a part of the fluid from the signal pipe flows into the limiting reservoir 82, thereby making a predetermined reduction in signal pipe pressure. The signal valve on the locomotive responds in the usual manner to the reduction in signal pipe pressure thus effected, and acts to supply fluid under pressure to the whistle to cause a signal of predetermined duration to be sounded.

According to this construction, the limiting reservoir is provided to limit the reduction in signal pipe pressure to such a degree that the substantially corresponding reduction in pressure in chamber 76 will not be sufficient to permit movement of the piston and slide valve from the left hand position.

When the valve 42 is seated and the valve 43 is unseated in the manner hereinbefore described, the valve 42 closes communication of chambers 44, 72 and 55 to atmosphere, and fluid under pressure is supplied to said chambers from the signal pipe by way of chamber 47 connected to said signal pipe through the passage 79. Following the equalization of the pressures on the opposite sides of piston 71, the spring 81 moves said piston to its normal position, and the slide valve is thereby operated to close communication of port 86 with the port 89 and to connect the limiting reservoir 82 to the atmosphere as shown in the drawing.

It will be noted that means are provided which will automatically operate the usual air signal system on a train to warn the engineman in case the brakes on a car of the train fail to release when the brake pipe pressure is increased to effect the release of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, a brake cylinder, a brake pipe, a valve device operated upon a reduction in brake pipe pressure for supplying fluid under pressure to the brake cylinder and upon a subsequent increase in brake pipe pressure for releasing fluid under pressure from the brake cylinder, a signal device, and means operated by brake pipe pressure and brake cylinder pressure upon failure of said valve device to release fluid under pressure from the brake cylinder in releasing the brakes, for effecting the operation of said signal device.

2. In combination, a brake cylinder, a brake pipe, a valve device operated upon a reduction in brake pipe pressure for supplying fluid under pressure to the brake cylinder and upon a subsequent increase in brake pipe pressure for releasing fluid under pressure from the brake cylinder, a signal device, and means operated by the increase in brake pipe pressure following a reduction in brake pipe pressure and by brake cylinder pressure for effecting the operation of said signal device.

3. In combination, a brake cylinder, a brake pipe, a valve device operated upon a reduction in brake pipe pressure for supplying fluid under pressure to the brake cylinder and upon a subsequent increase in brake pipe pressure for releasing fluid under pressure from the brake cylinder, a signal device, and means operated by the joint action of brake pipe pressure and brake cylinder pressure for effecting the operation of said signal device.

4. In a fluid pressure brake, the combination with a brake pipe, a brake cylinder, and a signal pipe, of valve means operative to effect a reduction in pressure of fluid in said signal pipe, a movable abutment operated by brake pipe pressure, a movable abutment operated by brake cylinder pressure, and means subject to the action of both of said abutments for effecting the operation of said valve means.

5. In a fluid pressure brake, the combination with a brake pipe, a brake cylinder, and a signal pipe, of valve means operative to effect a reduction in pressure of fluid in said signal pipe, a movable abutment operated by brake pipe pressure, a movable abutment operated by brake cylinder pressure, and a movable member operated by said abutments for controlling said valve means.

6. In a fluid pressure brake, the combination with a brake pipe, a brake cylinder, and a signal pipe, of valve means operative to effect a reduction in pressure of fluid in said signal pipe, a movable member for operating said valve means, a movable abutment operated by an increase in brake pipe pressure for operating said member, and a movable abutment acting on said movable member and operated by brake cylinder pressure for rendering said member operable by said brake pipe pressure controlled abutment.

7. In a fluid pressure brake, the combination with a brake pipe, a brake cylinder, and a signal pipe, of valve means operative to effect a reduction in pressure of fluid in said signal pipe, a movable abutment operated by brake pipe pressure, a movable abutment operated by brake cylinder pressure, and a movable member operatively connected to both abutments and operated by the joint action of both abutments for effecting the operation of said valve means.

8. In a fluid pressure brake, the combination with a brake pipe, a brake cylinder, and a signal pipe, of valve means subject to the opposing pressures of the fluid in the signal pipe and the fluid in a chamber and operative when the pressure of the fluid in the chamber is reduced to effect a reduction in the pressure of the fluid in said signal pipe, a movable abutment controlled by brake pipe pressure, a movable abutment controlled by brake cylinder pressure, and means subject to the action of both of said abutments for effecting a reduction in pressure of fluid in said chamber.

9. In combination, a signal pipe, means for effecting a reduction in fluid pressure in said pipe comprising a movable abutment subject to the opposing pressures of the fluid in the signal pipe and the fluid in a chamber, a valve operated by said abutment upon a reduction in the fluid pressure in said chamber for venting fluid under pressure from the signal pipe, and means for venting fluid under pressure from said chamber, fluid under pressure being vented from the signal pipe at a more rapid rate than from said chamber to thereby cause said abutment to operate to alternately open and close said valve.

10. In combination, a signal pipe, means for effecting a reduction in fluid pressure in said pipe comprising a movable abutment subject to the opposing pressures of the fluid in the signal pipe and the fluid in a chamber, a valve operated by said abutment upon a reduction in the fluid pressure in said chamber for venting fluid under pressure from the signal pipe, and means for cutting off the venting of fluid from the signal pipe by operation of said valve when the signal pipe pressure has been reduced to a predetermined degree.

11. In combination, a signal pipe, means for effecting a reduction in fluid pressure in said pipe comprising a movable abutment subject to the opposing pressures of the fluid in the signal pipe and the fluid in a chamber, a valve operated by said abutment upon a reduction in fluid pressure in said chamber for venting fluid under pressure from the signal pipe, valve means for normally supplying fluid under pressure to said chamber from the signal pipe and operative to vent fluid under pressure from said chamber, and means for operating said valve means.

12. In a fluid pressure system, in combination, a motor operated according to variations in fluid pressure, a control pipe normally charged with fluid under pressure, means operated upon a reduction in control pipe pressure for increasing the fluid pressure on the motor and upon an increase in control pipe pressure for reducing the fluid pressure on the motor, a signal device, and means operated by the joint action of control pipe pressure and the pressure of fluid acting on the motor for effecting the operation of said signal device.

13. The combination with a brake cylinder, a brake pipe, and a signal pipe, of valve means operative to effect a reduction in the pressure of fluid in said signal pipe, a movable yoke member operatively aligned intermediate its ends with said valve means, a movable abutment operatively connected to one end of said yoke member and responsive to variations in brake pipe pressure, and a movable abutment acting on the opposite end of said yoke member and responsive to variations in brake cylinder pressure.

14. In a fluid pressure brake, the combination with a brake pipe, a brake cylinder, and a signal pipe, of valve means operative to effect a reduction in the pressure of fluid in said signal pipe, a movable abutment operated by brake pipe pressure, a movable abutment operated by brake cylinder pressure, and a yoke member, the opposite ends of which are operatively connected to said abutments and which is operatively aligned intermediate its ends with said valve means.

15. In combination, a signal, a brake cylinder, a brake pipe, and means subject to and operated by variations in the pressure of the fluid in the brake cylinder and in the brake pipe for controlling operation of said signal.

16. In combination, a signal, a brake pipe, a brake cylinder, a member controlling operation of said signal, and means for controlling said member, said means comprising an abutment subject to the pressure of the fluid in the brake pipe, and an abutment subject to the pressure of the fluid in the brake cylinder.

17. In combination, a signal, a brake pipe, a brake cylinder, an abutment subject to the pressure of the fluid in the brake pipe, an abutment subject to the pressure of the fluid in the brake cylinder, and means operated by said abutments for controlling operation of said signal.

JOHN N. GOOD.